United States Patent
Smentek et al.

(10) Patent No.: US 9,281,866 B2
(45) Date of Patent: Mar. 8, 2016

(54) METHODS FOR ENHANCED POWER DELIVERY TO TOWER-MOUNTED AND OTHER REMOTELY-MOUNTED REMOTE RADIO HEADS AND RELATED SYSTEMS AND POWER CABLES

(71) Applicant: CommScope Technologies LLC, Hickory, NC (US)

(72) Inventors: David J. Smentek, Lockport, IL (US); Michael R. Guerin, St. Charles, IL (US); Morgan C. Kurk, Sachse, TX (US); John C. Chamberlain, Hickory, NC (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 14/487,329

(22) Filed: Sep. 16, 2014

(65) Prior Publication Data

US 2015/0080055 A1 Mar. 19, 2015

Related U.S. Application Data

(60) Provisional application No. 61/878,821, filed on Sep. 17, 2013.

(51) Int. Cl.
| | |
|---|---|
| *H04M 1/00* | (2006.01) |
| *H04B 1/38* | (2015.01) |
| *H04B 3/44* | (2006.01) |

(52) U.S. Cl.
CPC ............... *H04B 3/44* (2013.01); *Y10T 307/305* (2015.04); *Y10T 307/527* (2015.04)

(58) Field of Classification Search
CPC ........ H02J 7/345; H02J 1/06; Y10T 307/527; Y10T 307/305
USPC ....................................................... 455/561
See application file for complete search history.

(56) References Cited

U.S. PATENT DOCUMENTS

| | | |
|---|---|---|
| 2010/0181840 A1 | 7/2010 | Coulson et al. |
| 2011/0237299 A1 | 9/2011 | Boss et al. |
| 2012/0155120 A1* | 6/2012 | Sugawara .................. 363/21.12 |
| 2012/0269509 A1 | 10/2012 | Hultermans |
| 2013/0342949 A1* | 12/2013 | Xiong et al. .................. 361/119 |
| 2014/0055898 A1* | 2/2014 | Kostakis et al. ............. 361/91.5 |
| 2014/0204497 A1* | 7/2014 | Martinez Sanchez et al. ............... 361/119 |
| 2014/0372258 A1 | 12/2014 | Elberbaum |

FOREIGN PATENT DOCUMENTS

| | | |
|---|---|---|
| KR | 10-2010-0069332 A | 6/2010 |
| KR | 10-2011-0024543 A | 3/2011 |

OTHER PUBLICATIONS

International Search Report and Written Opinion Corresponding to International Application No. PCT/US2014/055800; Date of Mailing: Dec. 18, 2014; 14 Pages.
Jim Williams, et al., "2-Wire Virtual Remote Sensing for Voltage Regulators," Linear Technology, Application Note 126, Oct. 2010.
Notification of Transmittal of International Preliminary Report on Patentability, International Application No. PCT/US2014/055800; Date of Mailing: Sep. 17, 2015; 7 Pages.

* cited by examiner

*Primary Examiner* — Tanmay Shah
(74) *Attorney, Agent, or Firm* — Myers Bigel & Sibley, P.A.

(57) ABSTRACT

Tower systems suitable for use at cellular base stations include a tower, an antenna mounted on the tower, a remote radio head mounted on the tower and a power supply. A power cable having a power supply conductor and a return conductor is connected between the power supply and the remote radio head. A shunt capacitance unit that is separate from the remote radio head that is electrically coupled between the power supply conductor and the return conductor of the power cable.

19 Claims, 6 Drawing Sheets

US 9,281,866 B2

METHODS FOR ENHANCED POWER DELIVERY TO TOWER-MOUNTED AND OTHER REMOTELY-MOUNTED REMOTE RADIO HEADS AND RELATED SYSTEMS AND POWER CABLES

CROSS-REFERENCE TO RELATED APPLICATION

The present application claims priority under 35 U.S.C. §119 to U.S. Provisional Patent Application Ser. No. 61/878,821, filed Sep. 17, 2013, the disclosure of which is hereby incorporated herein by reference as if set forth in its entirety.

FIELD OF THE INVENTION

The present invention relates generally to remote radio heads, and more particularly to delivering power to remote radio heads at the top of antenna towers and/or in other locations that are remote from a power supply.

BACKGROUND

Cellular base stations typically include, among other things, a radio, a baseband unit, and one or more antennas. The radio receives digital information and control signals from the baseband unit and modulates this information into a radio frequency ("RF") signal that is then transmitted through the antennas. The radio also receives RF signals from the antenna and demodulates these signals and supplies them to the baseband unit. The baseband unit processes demodulated signals received from the radio into a format suitable for transmission over a backhaul communications system. The baseband unit also processes signals received from the backhaul communications system and supplies the processed signals to the radio. A power supply is provided that generates suitable direct current ("DC") power signals for powering the baseband unit and the radio. The radio is often powered by a (nominal) 48 Volt DC power supply.

In order to increase coverage and signal quality, the antennas in many cellular base stations are located at the top of a tower, which may be, for example, about fifty to two hundred feet tall. In early cellular systems, the power supply, baseband unit and radio were all located in an equipment enclosure at the bottom of the tower to provide easy access for maintenance, repair and/or later upgrades to the equipment. Coaxial cable(s) were routed from the equipment enclosure to the top of the tower that carried signal transmissions between the radio and the antennas. However, in recent years, a shift has occurred and the radio is now more typically located at the top of the antenna tower and referred to as a remote radio head ("RRH"). Using remote radio heads may significantly improve the quality of the cellular data signals that are transmitted and received by the cellular base station, as the use of remote radio heads may reduce signal transmission losses and noise. In particular, as the coaxial cable runs up the tower may be 100-200 feet or more, the signal loss that occurs in transmitting signals at cellular frequencies (e.g., 1.8 GHz, 3.0 GHz, etc.) over the coaxial cable may be significant. Because of this loss in signal power, the signal-to-noise ratio of the RF signals may be degraded in systems that locate the radio at the bottom of the tower as compared to cellular base stations where remote radio heads are located at the top of the tower next to the antennas (note that signal losses in the cabling connection between the baseband unit at the bottom of the tower and the remote radio head at the top of the tower may be much smaller, as these signals are transmitted at baseband frequencies or as optical signals on a fiber optic cable and then converted to RF frequencies at the top of the tower).

FIG. 1 schematically illustrates a conventional cellular base station 10 in which the radios are implemented as remote radio heads. As shown in FIG. 1, the cellular base station 10 includes an equipment enclosure 20 and a tower 30. The equipment enclosure 20 is typically located at the base of the tower 30, and a baseband unit 22 and a power supply 26 are located within the equipment enclosure 20. The baseband unit 22 may be in communication with a backhaul communications system 28. A plurality of remote radio heads 24 and a plurality of antennas 32 (e.g., three sectorized antennas 32) are located at the top of the tower 30. While the use of tower-mounted remote radio heads 24 may improve signal quality, it also requires that DC power be delivered to the top of the tower 30 to power the remote radio heads 24.

A fiber optic cable 38 connects the baseband unit 22 to the remote radio heads 24, as fiber optic links may provide greater bandwidth and lower loss transmissions. A power cable 36 is also provided for delivering the DC power signal up the tower 30 to the remote radio heads 24. The power cable 36 may include a first insulated power supply conductor and a second insulated return conductor. The fiber optic cable 38 and the power cable 36 may be provided together in a hybrid power/fiber optic "trunk" cable 40. The trunk cable 40 may include a plurality of individual power cables that each power a respective one of the remote radio heads 24 at the top of the antenna tower 30. The trunk cable 40 may include a breakout enclosure 42 at one end thereof (the end at the top of the tower 30). Individual optical fibers from the fiber optic cable 38 and individual conductors of the power cable 36 are separated out in the breakout enclosure 42 and connected to the remote radio heads 24 via breakout cords 44 (which may or may not be integral with the trunk cable 40) that run between the remote radio heads 24 and the breakout enclosure 42. Coaxial cables 46 are used to connect each remote radio head 24 to a respective one of the antennas 32.

The DC voltage of a power signal that is supplied to a remote radio head 24 from the power supply 26 over the power cable 36 may be determined as follows:

$$V_{RRH} = V_{PS} - V_{Drop} \quad (1)$$

where $V_{RRH}$ is the DC voltage of the power signal that is delivered to the remote radio head 24, $V_{PS}$ is the DC voltage of the power signal that is output by the power supply 26, and $V_{Drop}$ is the decrease in the DC voltage that occurs as the DC power signal traverses the power cable 36 and breakout cord 44 that connect the power supply 26 to the remote radio head 24. $V_{Drop}$ may be determined according to Ohm's Law as follows:

$$V_{Drop} = I_{RRH} * R_{Cable} \quad (2)$$

where $R_{cable}$ is the cumulative electrical resistance (in Ohms) along the power supply and the return conductors of the power cable 36 and breakout cord 44 that connect the power supply 26 to the remote radio head 24 and $I_{RRH}$ is the average current (in Amperes) flowing through the power cable 36 to the remote radio head 24. As is readily apparent from Equation (2), as the current drawn by a remote radio head 24 increases, the voltage drop $V_{Drop}$ along the power cable 36 will increase as well. The voltage drop $V_{Drop}$ of Equation 2 is also referred to herein as the I*R voltage drop.

The power cables 36 employed in antenna towers 30 typically use copper power supply and return conductors (or alloys thereof) that have physical properties which are familiar to those skilled in the art. One important property of these conductors is their electrical resistance. The electrical resistance of a conductor of the power cable 36 is inversely proportional to the diameter of the conductor (assuming a conductor having a circular cross-section). Thus, the larger the diameter of the conductors (i.e., the lower the gauge of the conductor), the lower the resistance of the power cable 36. Copper resistance is specified in terms of unit length, typically milliohms (mΩ)/ft; as such, the cumulative electrical resistance $R_{Cable}$ of the power cable 36 and the breakout cord 44 increases with the lengths of the cable 36 and the breakout cord 44. Thus, the longer the power cable 36, the higher the voltage drop $V_{Drop}$. This effect is well understand and is typically accounted for by engineering and the system architects.

Remote radio heads 24 are typically designed to operate properly if supplied with a DC power signal having a voltage within a specified range. Conventionally, the power supply 26 at the base of the tower 30 will be set to output a DC power signal having a fixed voltage $V_{PS}$. As $V_{Drop}$ is a function of the current $I_{RRH}$ that is supplied to the remote radio head 24 (see Equation 2 above), the voltage $V_{RRH}$ of the power signal that is delivered to the remote radio head 24 will change with variation in current drawn by the remote radio head 24 due to variation in the voltage drop $V_{Drop}$. If $V_{Drop}$ becomes too large, then the voltage of the power signal that is supplied to the remote radio head 24 may fall below the minimum voltage that is necessary to properly power the remote radio head 24.

SUMMARY

As a first aspect, embodiments of the invention are directed to tower systems that include a tower, an antenna mounted on the tower, a remote radio head mounted on the tower and a power supply. A power cable having a power supply conductor and a return conductor is connected between the power supply and the remote radio head. A shunt capacitance unit that is separate from the remote radio head that is electrically coupled between the power supply conductor and the return conductor of the power cable.

In some embodiments, the shunt capacitance unit may be configured to reduce a voltage drop at the remote radio head due to a spike in a current carried by the power cable. The power cable may terminate into a breakout enclosure, and the shunt capacitance unit may be mounted within the breakout enclosure. The breakout enclosure may be an integral part of the power cable. The power cable may be a hybrid power/fiber optic cable and the power cable may be one of a plurality of individual power cables that are included in the hybrid power/fiber optic cable, each of which includes a respective power supply conductor and a respective return conductor. The hybrid power/fiber optic cable may include a breakout enclosure in which the power supply conductors and the return conductors of the plurality of individual power cables are singulated, and the shunt capacitance unit may comprise a plurality of shunt capacitance units, and each individual power cable may have a respective one of the shunt capacitance units coupled between its power supply conductor and its return conductor within the breakout enclosure.

As a second aspect, embodiments of the invention are directed to methods of operating a tower system in which a direct current ("DC") power signal is output from a power supply and the DC power signal that is output from the power supply is supplied to a remote radio head that is mounted on a tower of the tower system over a power cable that has a power supply conductor, a return conductor and a shunt capacitance unit that is coupled between the power supply conductor and the return conductor. A voltage level of the DC power signal that is output from the power supply is adjusted so that the DC power signal at a first end of the power cable that is remote from the power supply has a substantially constant voltage notwithstanding variation in a current level of the DC power signal that is output from the power supply.

In some embodiments, the shunt capacitance unit may be located in a breakout enclosure that is part of the first end of the power cable. The power supply may be a programmable power supply, and the method may further include inputting information to the power supply from which the voltage level of the DC power signal that is output from the power supply can be determined that will provide the DC power signal at the first end of the power cable that has the substantially constant voltage. The current level of the DC power signal that is output from the power supply may be measured, and the voltage level of the DC power signal that is output by the power supply may be automatically adjusted in response to changes in the measured current level of the DC power signal that is output from the power supply to provide the DC power signal at the first end of the power cable that has the substantially constant voltage. The substantially constant voltage may be a voltage that exceeds a nominal power signal voltage of the remote radio head and which is less than a maximum power signal voltage of the remote radio head.

As a third aspect, embodiments of the invention are directed to hybrid power/fiber optic cables that include a cable segment that has a plurality of individual power cables, each of which includes an insulated power supply conductor and an insulated return conductor, a plurality of optical fibers, and a jacket enclosing the individual power cables and the plurality of optical fibers. These hybrid power/fiber optic cables further include at least one breakout enclosure that is mounted on a first end of the cable segment, the breakout enclosure receiving at least the plurality of individual power cables, the breakout enclosure including a plurality of shunt capacitance units, where each shunt capacitance unit is electrically connected between the insulated power supply conductor and the insulated return conductor of respective ones of the individual power cables.

In some embodiments, the shunt capacitance units may each have a plug-in capacitor that is received within a respective one of a plurality of sockets in the breakout enclosure. A capacitance of each shunt capacitance unit may be selected at least in part based on a length of the hybrid power/fiber optic cable. The breakout enclosure may be a first breakout canister that receives the plurality of individual power cables, and the hybrid power/fiber optic cable may further include a second breakout canister that receives the plurality of optical fibers and divides the plurality of optical fibers into smaller groups of optical fibers.

As a fourth aspect, embodiments of the invention are directed to methods of retrofitting a power supply system of a tower-mounted remote radio head are provided in which a shunt capacitance is inserted between a power supply conductor and a return conductor of a power cable that carries a DC power signal from a power supply to the remote radio head In some embodiments, the amount of the shunt capacitance may be at least 1,000 microFarads. In some embodiments, wherein the shunt capacitance may be provided in a breakout enclosure at the top of the tower.

DETAILED DESCRIPTION

Figure 1:
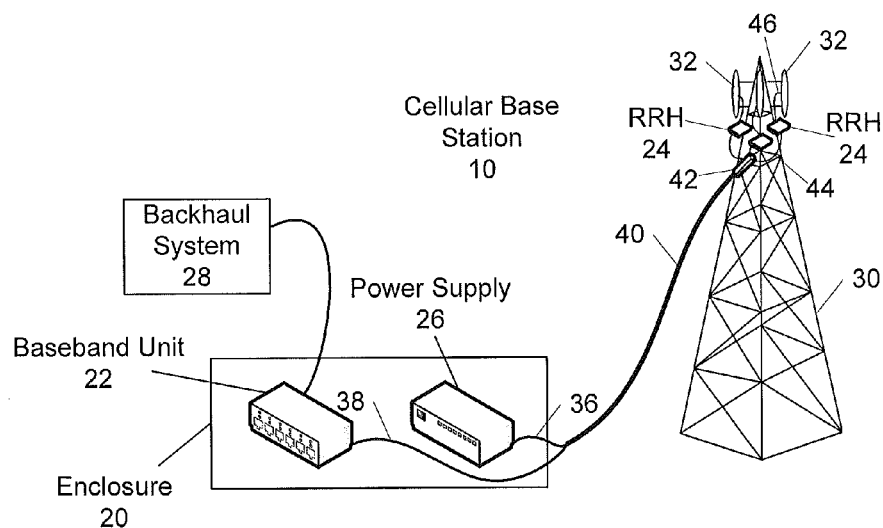
FIG. 1 is a simplified, schematic view of a conventional cellular base station in which several remote radio heads are located at the top of an antenna tower.

As discussed above, when remote radio heads are used in a cellular base station a voltage drop occurs along the power cables that connect a power supply at the base of the antenna tower to the remote radio heads at the top of the antenna tower. This voltage drop may cause several problems, as explained below.

First, as the current drawn by one of the remote radio heads increases, the voltage drop $V_{Drop}$ on the individual power cable(s) that connect the power supply to the remote radio head likewise increases. Consequently, the voltage of the power signal that is supplied to the remote radio head may, if the voltage drop becomes too large, fall below the minimum voltage that is necessary to properly power the remote radio head. Thus, for a power cable having copper conductors of a fixed size, the voltage drop $V_{Drop}$ may effectively limit the length of the power cable that may be used. While this limitation on the length of the power cable may be overcome by using larger conductors in the power cable, the use of larger conductors results in increased material and installation costs, increased loading on the tower and various other disadvantages.

Second, the voltage drop along the power cable also increases the cost of running the remote radio head, as power is lost when delivering the power signal to the remote radio head, and the amount of power lost is a function of the current running through the power cable. In particular, the power that is lost ($P_{Loss}$) in delivering the power signal to the remote radio head over a power cable may be calculated as follows:

$$P_{Loss} = V_{Drop} * I_{RRH} \quad (3)$$

where $V_{Drop}$=the average voltage drop in Volts along the power cable. Since antenna towers for cellular base stations may be hundreds of feet tall and the voltage and currents required to power each remote radio head may be quite high (e.g., about 50 Volts at about 20 Amperes of current), the power loss that may occur along the hundreds of feet of cabling may be significant.

Third, another physical property of the power cable that can result in a voltage drop is the inductance per unit length of the conductors of the cable. In particular, the cumulative inductance of the conductors of the power cable can produce a voltage drop that is expressed as:

$$V_{dI/dt\ Drop} = L*(dI/dt) \quad (4)$$

where L is the cumulative inductance of the conductors and dI/dt is the rate of change in current flowing through the conductors with respect to time. Herein, $V_{dI/dt\ Drop}$ is referred to as the "dI/dt voltage drop." Accordingly, not only is the voltage drop impacted by changes in current (see Equation 2), it is also impacted by how quickly the current changes (see Equation 4). Examples of scenarios where the current drawn by a remote radio head may change quickly (a "current spike") such that the DI/dt voltage drop can impact performance are (1) when multiple handsets connect and demand high speed data simultaneously and (2) when the remote radio head is turned off or on, or from idle to operational. Rapid current spikes may lead to large $V_{dI/dt\ Drop}$ values which have the potential to impact the performance of a remote radio head.

Pursuant to embodiments of the present invention, various methods are provided that may reduce the impact of the above-described voltage drops. These techniques may be used individually or together to improve the performance of cellular base stations that use remote radio heads that are mounted atop antenna towers. It will also be appreciated that cellular base stations exist where the remote radio heads and antennas are mounted in locations remote from the baseband equipment and power supply other than towers such as, for example, remote radio heads and antennas that are mounted on rooftops, atop utility poles, in subway tunnels and the like. It will be appreciated that the techniques described herein are equally applicable to these "non-tower" remote locations for the remote radio heads. Thus, while embodiments of the present invention are described below with reference to tower-mounted remote radio heads, it will be appreciated that all of the embodiments described below may be implemented in cellular base stations that place the remote radio heads in other locations such as on rooftops, atop utility poles and in tunnels or other locations that are remote from the power supply and baseband equipment along a "horizontal" direction.

For example, in some embodiments, a shunt capacitance unit such as, for example, a capacitor, may be provided between the two conductors of a power cable that is used to provide a DC power signal to a remote radio head. This shunt capacitance may reduce the dI/dt voltage drop that would otherwise occur in response to current spikes. In some embodiments, these shunt capacitance units may be integrated into a power cable or a trunk cable that includes a plurality of individual power cables that are used to power a plurality of remote radio heads on an antenna tower. The shunt capacitance units may, in some embodiments, be sized based on, for example, the length of the power cable and the resistance per unit length of the power supply and return conductors included in the power cable.

In some embodiments, the power cable including the shunt capacitance units may be used in conjunction with a programmable power supply that is configured to (1) sense the current being drawn by the remote radio head (or another suitable parameter) and (2) adjust the voltage of the power signal that is output by the power supply to substantially maintain the voltage of the power signal that is supplied to the remote radio head at or near a desired value. This desired voltage value may be, for example, a value that is close to the maximum voltage for the power signal that may be input to the remote radio head. In some embodiments, the programmable power supply may set the voltage of the DC power signal that is output by the power supply based on the resistance of the power cable and the current of the power signal that is output from the power supply so that the voltage of the power signal at the top of the tower will be substantially maintained at a desired level. The resistance of the power cable may, for example, be input to the power supply, calculated based on information that is input to the power supply or measured. As the current drawn by the remote radio head varies, the programmable power supply may adjust the voltage of its output power signal to a voltage level that will deliver a power signal to the remote radio head that is at or near the maximum voltage for a power signal that may be input to the remote radio head. As shown by Equation (5) below, which expands Equation (3), the power loss varies as the square of the current drawn by the remote radio head. By increasing the voltage of the signal that is delivered to the remote radio head, the current $I_{RRH}$ of the power signal is correspondingly reduced, thereby reducing the power loss. As a typical remote radio head may require about a kilowatt of power and may run 24 hours a day, seven days a week, and as a large number of remote radio heads may be provided at each cellular base station (e.g., three to twelve), the power savings may be significant.

$$P_{Loss} = V_{Drop} * I_{RRH} = (I_{RRH} * R_{Cable}) * I_{RRH} = I_{RRH}^2 * R_{Cable} \qquad (5)$$

While the above-discussed programmable power supply will alter the voltage of the power signal that it outputs in response to the current drawn by the remote radio head, the change in the voltage of the output power signal may lag behind the change in current. Thus, even when programmable power supplies are used, dI/dt losses may still arise that may degrade the performance of the remote radio head. Thus, in some embodiments, both programmable power supplies and power cables having shunt capacitance units may be used to counter the negative effects of both I*R and dI/dt voltage drops.

Using a capacitor to help maintain the voltage level of a signal during a spike in current is known in the art. Moreover, commercially available remote radio heads may include an internal bulk capacitance across the input terminals for the power supply leads that is used to reduce ripple and noise on the DC power signal line. However, it is not believed that appreciation of the impact of dI/dt voltage drops on remote radio head performance is well understood, nor is it believed to be understood the benefits that may accrue by providing, for example, a capability to provide a variable amount of shunt capacitance between the leads of a power cable for a remote radio head where the shunt capacitance unit may be sized based on the length of the power cable, the cumulative resistance of the conductors of the power cable and/or various other factors such that the shunt capacitance unit may be designed to overcome the problem of dI/dt voltage drops. According to some embodiments, the shunt capacitance units may be integrated directly into the power cable.

Embodiments of the present invention will now be discussed in more detail with reference to FIGS. 2-8, in which example embodiments of the present invention are shown.

As noted above, pursuant to embodiments of the present invention, power cables having relatively large shunt capacitance units may be provided that may be used to maintain the voltage of the power signal delivered to a remote radio head at or above a desired minimum level during current spikes. The effect of the inclusion of a large shunt capacitance on the voltage of the power signal delivered to the remote radio head is illustrated in FIGS. 2-4.

Figure 2A:
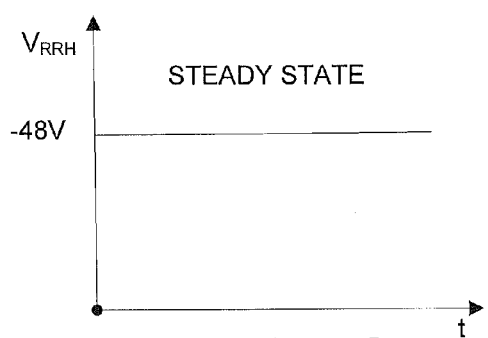
FIGS. 2A and 2B are graphs illustrating the DC voltage and current, respectively, of a DC power signal as function of time at a remote radio head under steady state conditions.
Figure 2B:
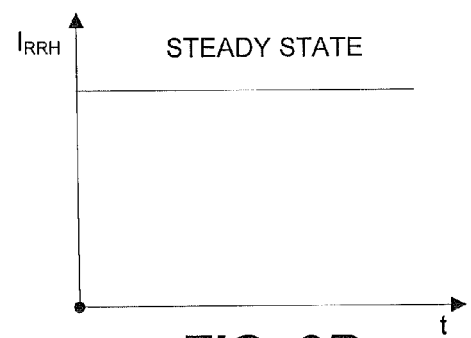

FIGS. 2A and 2B illustrate the power signal received at a remote radio head under steady state conditions. In particular, FIG. 2A is a graph plotting the DC voltage of the power signal ($V_{RRH}$) delivered to a remote radio head as function of time when the remote radio head is operating under steady state conditions, and FIG. 2B is a graph plotting the current of the power signal ($I_{RRH}$) drawn by the remote radio head as function of time during such steady state conditions. As shown in FIGS. 2A-2B, under such steady state conditions, the voltage $V_{RRH}$ and the current $I_{RRH}$ may remain constant.

Figure 3A:
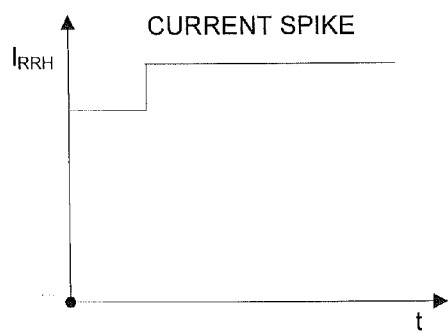
FIG. 3A is a graph illustrating the current of a DC power signal as function of time at a remote radio head during a current spike event.
Figure 3B:
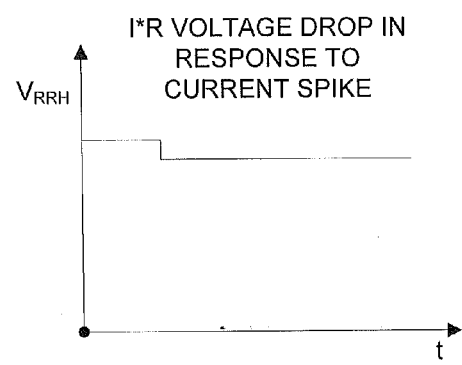
FIG. 3B is a graph illustrating how the DC voltage of the power signal varies as function of time at the remote radio head due to the I*R voltage drop in response to the current spike of FIG. 3A.
Figure 3C:
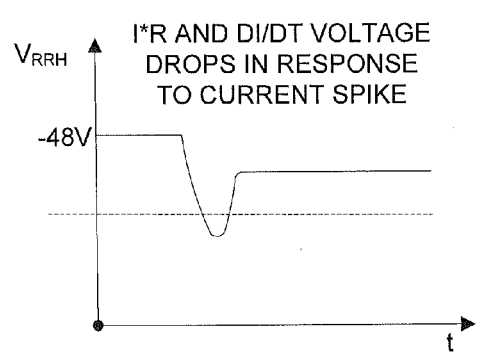
FIG. 3C is a graph illustrating the DC voltage of the DC power signal as function of time at the remote radio head in response to the current spike of FIG. 3A when both the I*R and the dI/dt voltage drops are taken into account.

FIGS. 3A-3C illustrate how the voltage and current of the power signal at the remote radio head change in response to a current spike. In particular, FIG. 3A illustrates a current spike which may occur in the power signal when the current requirements of the remote radio head are increased. As shown in FIG. 3A, the current spike may be approximated as a step function. Such a current spike may result, for example, if multiple carriers key up transmission simultaneously. Assuming that the power supply is outputting a power signal $V_{PS}$ having a constant voltage, FIG. 3B shows the effect that the increased current draw will have on the voltage of the power signal $V_{RRH}$ at the remote radio head. Specifically, as shown in FIG. 3B, the increased current draw will result in a decrease in the voltage of the power signal $V_{RRH}$ at the remote radio head based on Ohm's law. The graph of FIG. 3C illustrates how the dI/dt drop may further impact the voltage of the power signal $V_{RRH}$ supplied to the remote radio head. As shown in FIG. 3C, the dI/dt voltage drop may result in a temporary deep decrease in the voltage $V_{RRH}$ that gradually recovers to the new steady state voltage that applies. The broken line in FIG. 3C indicates the voltage level where the power signal may be inadequate to properly power the remote radio head. As shown in FIG. 3C, the dI/dt voltage drop may be sufficient in some cases to cause a remote radio head to temporarily malfunction due to an insufficient voltage level for the power signal.

Figure 4:
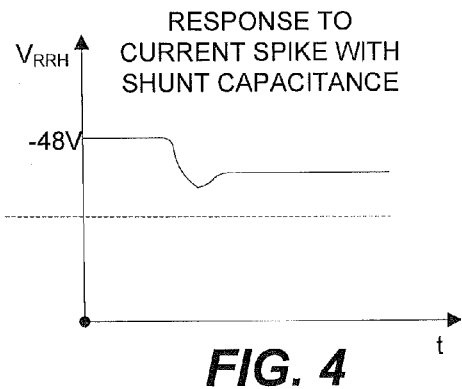
FIG. 4 is a graph illustrating the DC voltage of the DC power signal as function of time at a remote radio head in response to the current spike of FIG. 3A when both the I*R and the dI/dt voltage drops are taken into account when a shunted capacitance is used to dampen the effect of the dI/dt drop.

FIG. 4 is a graph illustrating how a shunt capacitance unit may be used to dampen the effect of the dI/dt voltage drop that is shown in FIG. 3C. As shown in FIG. 4, the shunt capacitance unit may dampen the effect of the current spike on the voltage $V_{RRH}$. The voltage spike of FIG. 3C is largely dissipated by the shunt capacitance unit, such that the voltage level $V_{RRH}$ does not drop below the broken line that indicates operational problems with the remote radio head. The shunt capacitance unit effectively acts as an auxiliary power supply that helps maintain the voltage by discharging the stored charges during the current spike event. Once steady state conditions are reached, the shunt capacitance unit may recharge to be available to dampen the effect of the next current spike. By including the shunt capacitance unit, undesirable events (e.g., the remote radio head shutting down) that the unwanted voltage spike might otherwise cause can be reduced or prevented.

Figure 5A:
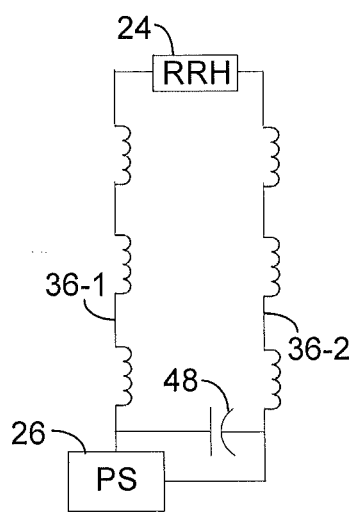
FIGS. 5A through 5C are circuit diagrams that illustrate example locations where a shunt capacitance unit may be place along a power cable that delivers a DC power signal up an antenna tower to a remote radio head.
Figure 5B:
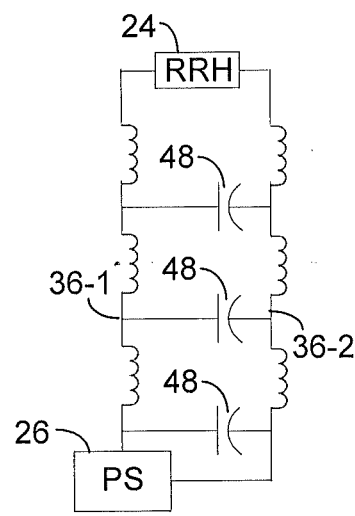
Figure 5C:
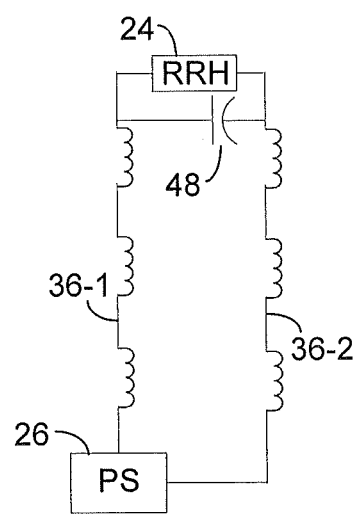

FIGS. 5A-5C are circuit diagrams that illustrate example locations where a shunt capacitance unit 48 may be place along a power cable 36 that delivers a power signal up an antenna tower 30 to a remote radio head 24. In each of FIGS. 5A-5C, a power supply 26 is connected via a power cable 36 to a remote radio head 24 that is mounted on an antenna tower 30. As shown in each of FIGS. 5A-5C, the power cable 36 for each remote radio head 24 may comprise a power supply conductor 36-1 and a return conductor 36-2. The conductors 36-1, 36-2 may each be modelled as a plurality of inductors that are disposed in series. In the embodiment of FIG. 5A, the shunt capacitance unit 48 is inserted between the power supply conductor 36-1 and the return conductor 36-2 near the power supply 26 (i.e., at the base of the tower 30). As an alternative, FIG. 5B shows that shunt capacitance unit 48 can be inserted as a series of shunt capacitors 48 that are interposed at different points along the power supply conductor 36-1 and the return conductor 36-2. FIG. 5C shows that shunt capacitance unit 48 can be inserted between the power supply conductor 36-1 and the return conductor 36-2 near the remote radio head 24 at or near the top of the tower 30.

Figure 6A:
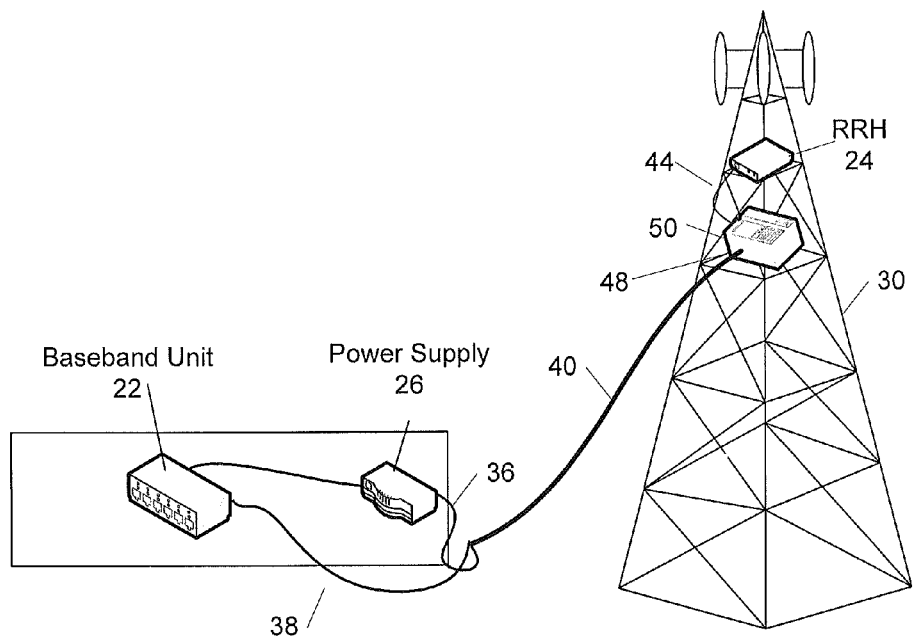
FIGS. 6A and 6B are schematic diagrams of cellular base stations that illustrate example locations where shunt capacitance unit may be located at the top of the antenna tower.
Figure 6B:
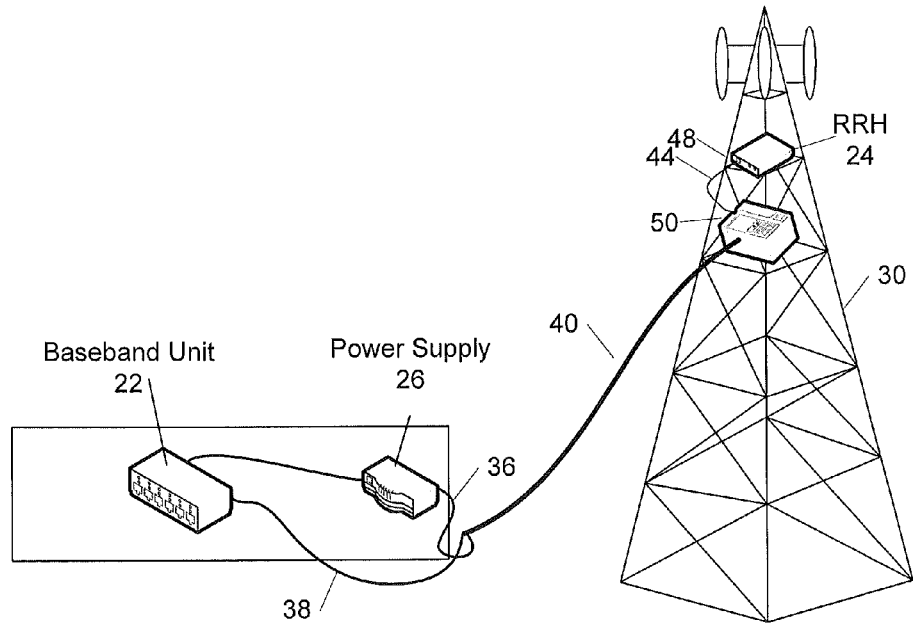

In some embodiments such as the embodiment shown in FIG. 5C, the shunt capacitance unit 48 is placed very close to the remote radio head 24. FIGS. 6A and 6B identify two locations near a remote radio head 24 which may be considered both accessible and functional as locations for the shunt capacitance unit 48. As shown in FIG. 6A, the tower 30 may include a breakout box 50 (which typically includes a bus bar, fiber breakout units, and the like) that is positioned adjacent a remote radio head 24 near the top of the tower 30. The remote radio head 24 is connected to the breakout box 50 via a breakout cord 44. A power supply 26 is connected to the breakout box 50 via the power cable 36 (which may be a hybrid power/fiber optic trunk cable 40). As shown in FIG. 6A, one exemplary location for the shunt capacitance unit 48 is inside or at the breakout box 50, which would be located at a relatively long distance up the tower 100. In FIG. 6B, a cellular base station having the same components as the cellular base station of FIG. 6A is shown, with the exception that the shunt capacitance 48 is connected at the input of the remote radio head 24. Both of these locations are relatively accessible.

Figure 7:
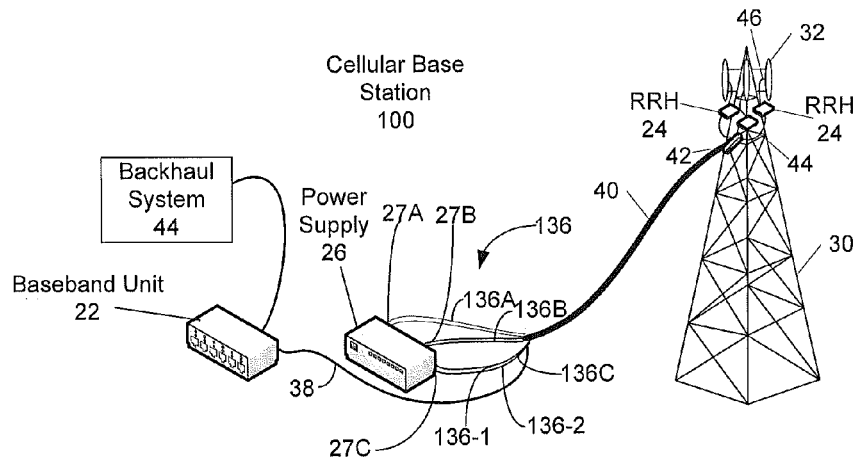
FIG. 7 is a schematic diagram illustrating a cellular base station according to further embodiments of the present invention that uses a power cable having shunt capacitance units built into the power cable.

FIG. 7 is a schematic block diagram illustrating a cellular base station 100 according to further embodiments of the present invention that includes shunt capacitance units in a power cable 136 that supplies DC power signals from a power supply 26 to a plurality of remote radio heads 24. As shown in FIG. 7, a total of three remote radio heads 24 are mounted on an antenna tower 30. The power cable 136 includes three pairs of insulated copper conductors 136A-136C (i.e., three individual power cables 136A-136C are included in the composite power cable 136) that are used to deliver the DC power signals from the power supply 26 to the respective remote radio heads 24. Each pair of insulated copper conductors 136A-136C includes a power supply conductor 136-1 and a return conductor 136-2. The power supply 26 includes three outputs 27A-27C. One end of each of the individual power cables 136A-136C is connected to a respective one of the outputs 27A-27C on power supply 26, while the other end of each of the individual power cables 136A-136C is connected to a respective one of the remote radio heads 24. The three outputs 27A-27C on the power supply 26 are independent from each other and may each deliver a power signal that meets the power needs of a respective one of the remote radio heads 24. Thus, through the outputs 27, the power supply 26 may provide three independent power signals having voltage and current characteristics that are suitable for meeting the instantaneous power requirements of each of the remote radio heads 24.

Figure 8:
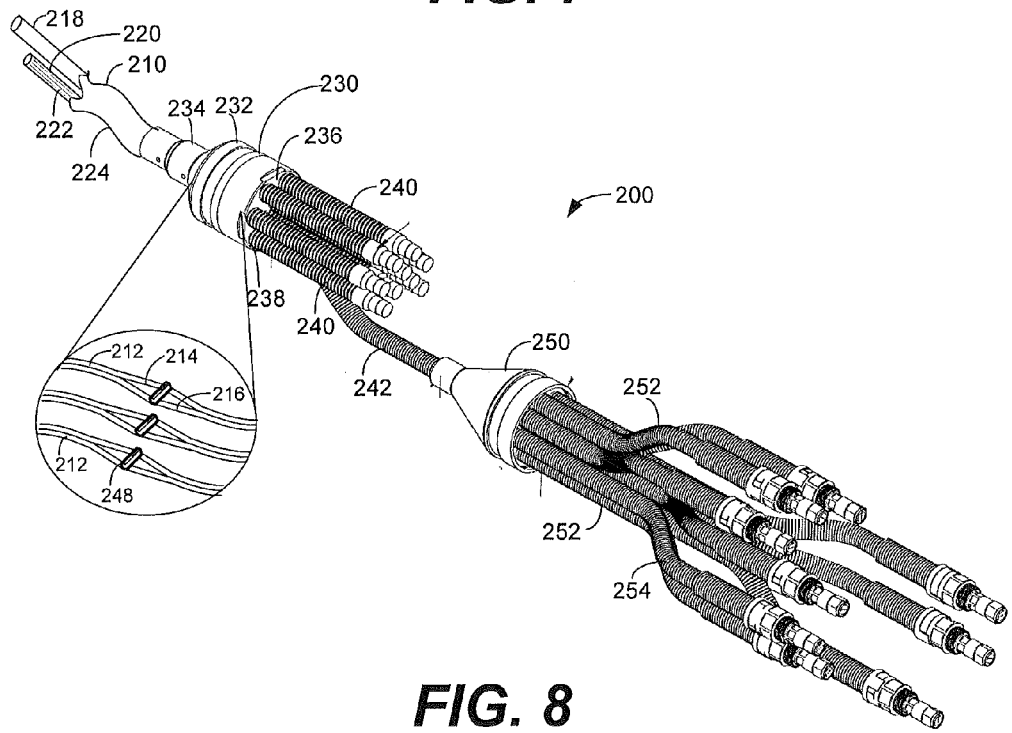
FIG. 8 is a perspective view of an end portion of a hybrid power/fiber optic cable that may be used to implement the trunk cable of FIG. 7.

FIG. 8 is a schematic diagram illustrating a trunk cable assembly 200 that may used, for example, to implement the power cable 136 (as well as the fiber optic cable 38) of FIG. 7. The trunk cable assembly 200 of FIG. 8 comprises a hybrid power/fiber optic cable 210, a first breakout canister 230 and a second breakout canister 250. The hybrid power/fiber optic cable 210 has nine individual power cables 212 (see the callout in FIG. 8, which depicts three of the individual power cables 212), which may be stranded together to form a composite power cable 218, and a fiber optic cable 220 that includes thirty-six optical fibers 222. The fiber optic cable 220 may comprise a jacketed or unjacketed fiber optic cable of any appropriate conventional design. The composite power cable 218 and the fiber optic cable 220 may be enclosed in a jacket 224. While one example hybrid power/fiber optic cable 210 is shown in FIG. 8, it will be appreciated that any conventional hybrid power/fiber optic cable may be used, and that the cable may have more or fewer power cables and/or optical fibers. An exemplary hybrid power/fiber optic cable is the HTC-24SM-1206-618-APV cable, available from CommScope, Inc. (Hickory, N.C.).

The first breakout canister 230 comprises a body 232 and a cover 236. The body 232 includes a hollow stem 234 at one end that receives the hybrid power/fiber optic cable 210, and a cylindrical receptacle at the opposite end. The cover 236 is mounted on the cylindrical receptacle to form the breakout canister 230 having an open interior. The hybrid power/fiber optic cable 210 enters the body 232 through the stem 234. The composite power cable 218 is broken out into the nine individual power cables 212 within the first breakout canister 230. Each individual power cable 212 includes a power supply conductor 214 and a return conductor 216. The nine individual power cables 212 are routed through respective sockets 238 in the cover 236, where they are received with respective protective conduits 240 such as a nylon conduit that may be sufficiently hardy to resist damage from birds. Thus, each individual power cable 212 extends from the first breakout canister 230 within a respective protective conduit 240. The optical fibers 222 are maintained as a single group and are routed through a specific socket 238 on the cover 236, where they are inserted as a group into a conduit 242. Thus, the first breakout canister 230 is used to singulated the nine power cables 212 of composite power cable 218 into individual power cables 212 that may be run to respective remote radio heads 24, while passing all of the optical fibers 222 to a separate breakout canister 250.

As shown in the inset of FIG. 8, a plurality of shunt capacitance units in the form of ceramic capacitors 248 are provided within the first breakout canister 230. Each shunt capacitor 248 is connected between the power supply conductor 214 and the return conductor 216 of a respective one of the individual power cables 212. The breakout canister may include a plurality of sockets that each receive one of the capacitors 248. Each individual power cable may be physically and electrically connected to these sockets. For low frequency signals such as a DC power signal, the shunt capacitors 248 appear as an open circuit, and thus the DC power signal that is carried on each individual power cable 212 will pass by the respective shunt capacitance 248 to the remote radio heads 24. However, as discussed above, during periods where the current carried by an individual power cable 212 spikes in response to an increased current requirement at the remote radio head 24, the shunt capacitor 248 may act akin to an auxiliary power supply to reduce the magnitude of the dI/dt voltage drop on the DC power signal.

As noted above, the optical fibers 222 pass through the first breakout canister 230 as a single unit in conduit 242 which connects to the second breakout canister 250. In the second breakout canister 250, the thirty-six optical fibers 222 are separated into nine optical fiber subgroups 252. The optical fiber subgroups 252 are each protected within a respective conduit 254. The second breakout canister 250 may be similar to the first breakout canister 230, and hence will not be discussed in further detail. The second breakout canister 250, however, does not include the shunt capacitors 248.

As is known to those of skill in the art, commercially available remote radio heads may have capacitances across the leads that receive a power cable that powers the remote radio head. However, this capacitance is typically small and may not be sufficient to dampen the dI/dt voltage drop. By providing power cables such as the hybrid power/fiber optic cable assembly 200 of FIG. 8 that have shunt capacitors 248 integrated into each individual power cable 212, it is possible to ensure that a sufficient shunt capacitance is provided in each instance. For example, as discussed above, voltage drop becomes a more significant issue the longer the power cable, as I*R based voltage drops increase linearly with the length of the power cable. Thus, longer power cables are more likely to experience the situation illustrated in FIG. 3C above where the combination of the I*R voltage drop and the dI/dt voltage drop may cause the voltage of the power signal to temporarily dip below some minimum required voltage level, thereby disrupting operation of the remote radio head. By implementing the shunt capacitances within the power cables—which may be sold in known lengths—the shunt capacitances may be appropriately pre-sized to provide a sufficient amount of capacitance while not providing excess capacitance that may increase the cost, size and/or weight of the power cable.

Additionally, by implementing the shunt capacitances within the power cable and, more particularly, within a breakout enclosure of the power cable, it is possible to have shunt capacitances that may be sized appropriately at the time of installation. For example, in some embodiments, the shunt capacitance may be plug-in or screw-in capacitors that are connected across the conductors of each power cable so that the appropriately-sized capacitor may be installed in the breakout canister based on the specific requirements of the cellular base station. Additionally, since the breakout canisters may be opened up, if necessary, after installation, defective or damaged capacitors may be replaced if needed.

Those of skill in this art will appreciate that the shunt capacitances used in embodiments of the present invention may be provided in any number of forms. For example, a shunt capacitance unit may be in the form of individual components, such as one or more capacitors, or in the form of other physical structures such as parallel conductors separated by an air gap that may act like a capacitor. The amount of shunt capacitance provided may vary depending on a number of factors including, for example, the length of the conductors and the diameter of the conductors. Generally speaking, the amount of shunt capacitance may be on the order of hundreds, thousands, tens of thousands, or hundreds of thousands of microfarads in some embodiments.

The benefits that may accrue from using shunt capacitances in the manner described herein may include the following. From a system perspective, the conductors of a power cable for a remote radio head need not be oversized or overdesigned to compensate for large dI/dt voltage drops; consequently, longer conductor runs utilizing less conductor material are possible. The use of less conductor material also allows for lighter cable power cable assemblies, which can also be advantageous because increased current demand at the top of the tower is a rapidly developing issue. Moreover, existing tower architectures may be retrofitted with this approach with minimal impact to mounted hardware should dI/dt voltage drops arise as an issue. In particular, embodiments of this invention can allow for a variable amount of required capacitance based on, for example, conductor length while also allowing the ability to retrofit an existing tower, power cable, or remote radio head architecture.

Pursuant to further embodiments of the present invention, power cables that include shunt capacitances may be used in cellular base stations that employ programmable power supplies that are used to reduce the I*R voltage drop by maintaining the voltages of the power signals at the remote radio heads at or near a maximum voltage for the power signal that is specified for each remote radio head. Examples of such an embodiment will now be described with reference to FIG. 9.

Figure 9:
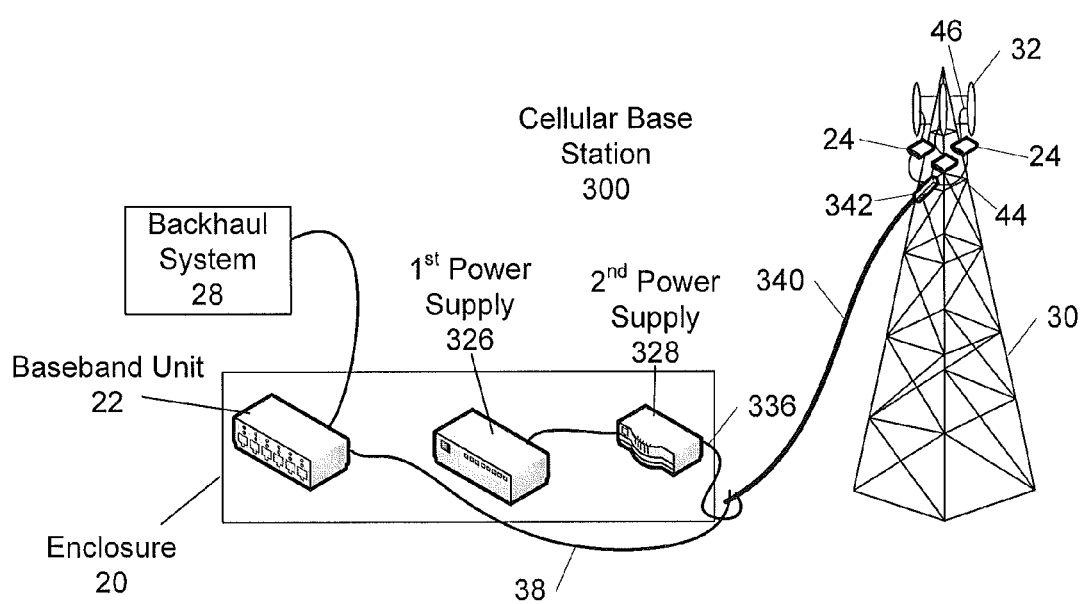
FIG. 9 is a schematic block diagram of a cellular base station according to further embodiments of the present invention.

In particular, FIG. 9 is a schematic block diagram of a cellular base station 300 according to embodiments of the present invention. As shown in FIG. 3, the cellular base station 300 includes an equipment enclosure 20 and a tower 30. A baseband unit 22, a first power supply 326 and a second power supply 328 are located within the equipment enclosure 20. A plurality of remote radio heads 24 and plurality of antennas 32 are mounted on the tower 30.

Each remote radio head 24 receives digital information and control signals from the baseband unit 22 over a fiber optic cable 38. The remote radio head 24 modulates this information into a radio frequency ("RF") signal at the appropriate cellular frequency that is then transmitted through an antennas 32. Each remote radio head 24 also receives RF signals from an antenna 32, demodulates these signals, and supplies the demodulated signals to the baseband unit 22 over the fiber optic cable 38. The baseband unit 22 processes the demodulated signals received from the remote radio head 24 and forwards the processed signals to the backhaul communications system 28. The baseband unit 22 also processes signals received from the backhaul communications system 28 and supplies them to the remote radio heads 24. Typically, the baseband unit 22 and the remote radio heads 24 each include optical-to-electrical and electrical-to-optical converters that couple the digital information and control signals to and from the fiber optic cable 38.

The first power supply 326 generates direct current ("DC") power signals. The second power supply 328 is a DC-to-DC converter that accepts the DC power signal output by the first power supply 326 as an input and outputs a DC power signal having a different voltage. A power cable 336 is connected to the output of the second power supply 328 and routed up the tower 30. In some embodiments, the fiber optic cable 38 and the power cable 336 may be implemented together as a hybrid power/fiber optic cable 340 which may be implemented, for example, using the hybrid power/fiber optic cable assembly 200 of FIG. 8. While the first power supply 326 and the second power supply 328 are illustrated as separate power supply units in the embodiment of FIG. 9, it will be appreciated that the two power supplies 326, 328 may be combined into a single power supply unit in other embodiments.

The power supply 328 is a programmable power supply that receives input DC power signals from power supply 326 and outputs DC power signals to each of the individual power cables within the power cable 336. The voltage of the DC power signal output by the power supply 328 may vary in response to variations in the current of the DC power signal drawn from the power supply 328 by the remote radio heads 24 that are connected to each individual power cable. The voltage of the DC power signal output by the power supply 328 may be set so that the voltage of the DC power signal at the far end of each individual power cable in power cable 336 (i.e., the end adjacent the remote radio heads 24) is maintained at or near the maximum specified voltage for the power signal of the remote radio heads 24. This may reduce the power loss associated with supplying the DC power signal to the remote radio head 24, since, for a given power level, a higher voltage for the DC power signal corresponds to a lower current, and lower current values result in reduced power loss. In some embodiments, the programmable power supply 328 may be designed to maintain the voltage of the DC power signal at or near a voltage for the power signal that may be supplied to the remote radio head 24.

In some embodiments, the voltage of the DC power signal at the far end of the individual power cables in power cable 336 may be maintained at or near a predetermined value by setting the voltage level of the power signal output by power supply 328 based on (1) the current of the DC power signal drawn from the power supply (note from Equations 1 and 2 that $V_{RRH}$ is a function of $I_{RRH}$) and (2) the resistance $R_{Cable}$ of the power cable. The programmable power supplies according to embodiments of the present invention may be configured to measure, estimate, calculate or receive both values. U.S. patent application Ser. No. 14/321,897 ("the '897 application"), filed Jul. 2, 2014, describes various programmable power supplies that may be used to implement the programmable power supply 328. The '897 application is incorporated by reference herein in its entirety, and hence further description of regarding implementation of these programmable power supplies entire will be omitted. In other embodiments, a feedback loop may be used to control the voltage of the DC power signal output by the DC power supply so that the voltage of the DC power signal at the far end of the power cable that connects the power supply 328 and a remote radio head 24 is maintained at a desired level. The use of such feedback loops is also discussed in the '897 application.

The use of such programmable power supplies may both reduce power losses and also reduce the I*R voltage drop, as supplying power signals having voltages that are maintained near a maximum acceptable value to each remote radio head reduces the average current of the power signals, thereby reducing I*R voltage drop. Additionally, the cellular base stations according to embodiments of the present invention may also employ shunt capacitances on each individual power cable in the manner described above with reference to FIGS. 2-8 to reduce the impact of dI/dt voltage drops.

The present invention has been described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. Like numbers refer to like elements throughout the specification and drawings. It will also be appreciated that the embodiments disclosed above can be combined in any way and/or combination to provide many additional embodiments. For example, the shunt capacitance units described herein may be used in any of the example embodiments disclosed in the above-described '897 application.

It will be understood that, although the terms first, second, etc. are used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

Unless otherwise defined, all technical and scientific terms that are used in this disclosure have the same meaning as commonly understood by one of ordinary skill in the art to which this invention belongs. The terminology used in the above description is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. A tower system, comprising:
    a mounting structure;
    an antenna mounted on the mounting structure;
    a remote radio head mounted on the mounting structure;
    a power supply;
    a power cable having a power supply conductor and a return conductor connected between the power supply and the remote radio head; and
    a shunt capacitance unit that is separate from the remote radio head that is electrically coupled between the power supply conductor and the return conductor of the power cable;
    wherein the power cable comprises a hybrid power/fiber optic cable and the power cable is one of a plurality of individual power cables included in the hybrid power/fiber optic cable, each of which includes a respective power supply conductor and a respective return conductor; and
    wherein the hybrid power/fiber optic cable includes a breakout enclosure in which the power supply conductors and the return conductors of the plurality of individual power cables are singulated, and wherein the shunt capacitance unit comprises a plurality of shunt capacitance units, and wherein each individual power cable has a respective one of the shunt capacitance units coupled between its power supply conductor and its return conductor within the breakout enclosure.

2. The tower system of claim 1, wherein the shunt capacitance unit is configured to reduce a voltage drop at the remote radio head due to a spike in a current carried by the power cable.

3. The tower system of claim 1, wherein the breakout enclosure is an integral part of the power cable.

4. The tower system of claim 1, wherein the power supply is configured to adjust a voltage level of a DC power signal that is output from the power supply so that the DC power signal at a first end of the power cable that is remote from the power supply has a substantially constant voltage notwithstanding variation in a current level of the DC power signal that is output from the power supply.

5. The tower system of claim 4, wherein the power supply is configured to automatically adjust the voltage level of the DC power signal in response to changes in a measured current level of the DC power signal.

6. The tower system of claim 4, wherein the substantially constant voltage comprises a voltage that exceeds a nominal power signal voltage of the remote radio head and which is less than a maximum power signal voltage of the remote radio head.

7. The tower system of claim 1, wherein the breakout enclosure comprises a first breakout canister that receives the plurality of individual power cables, the hybrid power/fiber optic cable further including a second breakout canister that receives a plurality of optical fibers and divides the plurality of optical fibers into smaller groups of optical fibers.

8. The tower system of claim 1, wherein a capacitance of a first of the shunt capacitance units is at least 1,000 microFarads.

9. The tower system of claim 1, wherein the mounting structure is an antenna tower.

10. The tower system of claim 1, wherein the mounting structure is a pole.

11. The tower system of claim 1, wherein a capacitance of a first of the shunt capacitance units is selected at least in part based on a length of the hybrid power/fiber optic cable and resistances per unit length of a first of the power supply conductors and a first of the return conductors.

12. A tower system, comprising:
a mounting structure;
an antenna mounted on the mounting structure;
a remote radio head mounted on the mounting structure;
a power supply;
a power cable having a power supply conductor and a return conductor connected between the power supply and the remote radio head; and
a shunt capacitance unit that is separate from the remote radio head that is electrically coupled between the power supply conductor and the return conductor of the power cable;
wherein the power cable comprises a hybrid power/fiber optic cable and the power cable is one of a plurality of individual power cables included in the hybrid power/fiber optic cable, each of which includes a respective power supply conductor and a respective return conductor; and
wherein the hybrid power/fiber optic cable includes a breakout enclosure in which the power supply conductors and the return conductors of the plurality of individual power cables are singulated, and wherein the shunt capacitance unit comprises a plurality of shunt capacitance units, and wherein each individual power cable has a respective one of the shunt capacitance units coupled between its power supply conductor and its return conductor within the breakout enclosure; and
wherein the shunt capacitance units each comprise a plug-in capacitor that is received within a respective one of a plurality of sockets in the breakout enclosure.

13. The tower system of claim 12, wherein the power supply is configured to adjust a voltage level of a DC power signal that is output from the power supply so that the DC power signal at a first end of the power cable that is remote from the power supply has a substantially constant voltage notwithstanding variation in a current level of the DC power signal that is output from the power supply.

14. The tower system of claim 13, wherein the power supply is configured to automatically adjust the voltage level of the DC power signal in response to changes in a measured current level of the DC power signal.

15. The tower system of claim 13, wherein the substantially constant voltage comprises a voltage that exceeds a nominal power signal voltage of the remote radio head and which is less than a maximum power signal voltage of the remote radio head.

16. A tower system, comprising:
a mounting structure;
an antenna mounted on the mounting structure;
a remote radio head mounted on the mounting structure;
a power supply;
a power cable having a power supply conductor and a return conductor connected between the power supply and the remote radio head; and
a shunt capacitance unit that is separate from the remote radio head that is electrically coupled between the power supply conductor and the return conductor of the power cable;
wherein the power cable comprises a hybrid power/fiber optic cable and the power cable is one of a plurality of individual power cables included in the hybrid power/fiber optic cable, each of which includes a respective power supply conductor and a respective return conductor; and
wherein the hybrid power/fiber optic cable includes a breakout enclosure in which the power supply conductors and the return conductors of the plurality of individual power cables are singulated, and wherein the shunt capacitance unit comprises a plurality of shunt capacitance units, and wherein each individual power cable has a respective one of the shunt capacitance units coupled between its power supply conductor and its return conductor within the breakout enclosure; and
wherein a capacitance of each shunt capacitance unit is selected at least in part based on a length of the hybrid power/fiber optic cable.

17. The tower system of claim 16, wherein the power supply is configured to adjust a voltage level of a DC power signal that is output from the power supply so that the DC power signal at a first end of the power cable that is remote from the power supply has a substantially constant voltage notwithstanding variation in a current level of the DC power signal that is output from the power supply.

18. The tower system of claim 17, wherein the power supply is configured to automatically adjust the voltage level of the DC power signal in response to changes in a measured current level of the DC power signal.

19. The tower system of claim 17, wherein the substantially constant voltage comprises a voltage that exceeds a nominal power signal voltage of the remote radio head and which is less than a maximum power signal voltage of the remote radio head.

* * * * *